United States Patent
Knoll et al.

(10) Patent No.: US 7,524,899 B2
(45) Date of Patent: Apr. 28, 2009

(54) BLENDS OF STYRENE/BUTADIENE BLOCK COPOLYMERS

(75) Inventors: Konrad Knoll, Mannheim (DE); Roland Weidisch, Schönebeck (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 410 days.

(21) Appl. No.: 11/085,473

(22) Filed: Mar. 22, 2005

(65) Prior Publication Data

US 2005/0215723 A1 Sep. 29, 2005

(30) Foreign Application Priority Data

Mar. 23, 2004 (DE) .................. 10 2004 014 585

(51) Int. Cl.
  *C08L 53/02* (2006.01)
(52) U.S. Cl. .................. 525/89; 525/271; 525/314; 525/315; 525/316
(58) Field of Classification Search .................. 525/89, 525/271, 314, 315, 316
  See application file for complete search history.

(56) References Cited

U.S. PATENT DOCUMENTS

| | | | |
|---|---|---|---|
| 4,335,221 A | | 6/1982 | Gerberding |
| 5,227,419 A | | 7/1993 | Moczygemba et al. |
| 5,344,869 A | * | 9/1994 | Seelert et al. ............. 524/505 |
| 5,466,499 A | * | 11/1995 | Takagi et al. ............. 428/36.9 |
| 6,369,160 B1 | | 4/2002 | Knoll et al. |
| 7,064,164 B2 | * | 6/2006 | Knoll et al. ............. 525/89 |
| 2003/0083415 A1 | * | 5/2003 | Contrada et al. ............. 524/386 |
| 2003/0166781 A1 | * | 9/2003 | Berger et al. ............. 525/191 |
| 2004/0147674 A1 | * | 7/2004 | Kakeda et al. ............. 525/88 |
| 2007/0039289 A1 | * | 2/2007 | LeCompte ............. 54/82 |

FOREIGN PATENT DOCUMENTS

| | | |
|---|---|---|
| EP | 0 254 346 A2 | 1/1988 |
| EP | 0 254 346 A3 | 1/1988 |
| WO | WO-03/046075 A1 | 6/2003 |

OTHER PUBLICATIONS

*Polystyrol* by Carl-Hanser-Verlag, Kunststoff Handbuch, vol. 4, Kap. 3.3.4, pp. 161-164.

* cited by examiner

*Primary Examiner*—Jeffrey C Mullis
(74) *Attorney, Agent, or Firm*—Connolly Bove Lodge & Hutz LLP

(57) ABSTRACT

A blend comprising
a) from 5 to 40% by weight of a linear block copolymer of vinylaromatic monomers and dienes of the structure (I) $S_1$—$(B/S)_1$—$S_2$ having a flexible phase fraction $(B/S)_1$ of not more than 55% by weight, based on the block copolymer (I) and
b) from 95 to 60% by weight of a linear block copolymer of vinylaromatic monomers and dienes of the structure (II) $S_3$—$(B/S)_2$—$S_4$ having a flexible phase fraction $(B/S)_2$ of at least 65% by weight, based on the block copolymer (II), where
$S_1$ is a block of vinylaromatic monomers having a number average molar mass $M_n$ in the range from 40 000 to 100 000 g/mol,
$S_2$, $S_3$ and $S_4$ are in each case blocks of vinylaromatic monomers having a number average molar mass $M_n$ in the range from 5000 to 20 000 g/mol,
$(B/S)_1$ and $(B/S)_2$ are in each case copolymer blocks of dienes and vinylaromatic monomers having a number average molar mass $M_n$ in the range from 15 000 to 40 000 g/mol.

15 Claims, No Drawings

BLENDS OF STYRENE/BUTADIENE BLOCK COPOLYMERS

This application claims priority from German Application 102004014585.7 filed Mar. 23, 2004.

The present invention relates to blends comprising a) from 5 to 40% by weight of a linear block copolymer of vinylaromatic monomers and dienes of the structure (I) $S_1$—$(B/S)_1$—$S_2$ having a flexible phase fraction $(B/S)_1$ of not more than 55% by weight, based on the block copolymer (I) and b) from 95 to 60% by weight of a linear block copolymer of vinylaromatic monomers and dienes of the structure (II) $S_3$—$(B/S)_2$—$S_4$ having a flexible phase fraction $(B/S)_2$ of at least 65% by weight, based on the block copolymer (II), where $S_1$ is a block of vinylaromatic monomers having a number average molar mass $M_n$ in the range from 40 000 to 100 000 g/mol, $S_2$, $S_3$ and $S_4$ are in each case blocks of vinylaromatic monomers having a number average molar mass $M_n$ in the range from 5000 to 20 000 g/mol, $(B/S)_1$ and $(B/S)_2$ are in each case copolymer blocks of dienes and vinylaromatic monomers having a number average molar mass $M_n$ in the range from 15 000 to 40 000 g/mol.

The present invention furthermore relates to processes for the preparation of the blends and the partial or complete hydrogenation thereof.

Styrene/butadiene block copolymers and blends with polystyrene are known in a variety of structures. The block copolymers may be linear or branched in a star-like manner and may have blocks of identical or different molar masses, so that symmetrical and asymmetrical structures result. The butadiene-containing blocks may also contain styrene. Sharp or tapered transitions may occur between the individual blocks. An overview of styrene/butadiene block copolymers is to be found, for example, in Kunststoff Handbuch, Vol. 4 Polystyrol, Carl Hanser-Verlag Munich-Vienna 1996, Section 3.3.4, pages 161-164.

Blends of linear three-block copolymers S—B—S having different compositions and molar masses are disclosed in DE-A 29 40 861. The blend is obtained by sequential anionic polymerization with dual, joint initiator and styrene metering. The ratio of the amount of initiator in the first stage to that in the second stage is in the range from 1:2 to 1:7, i.e. the block copolymer having the shorter styrene block substantially predominates. While the transition between the first styrene block and the butadiene-containing block is sharp, the butadiene-containing block has a gradual transition into the second styrene block.

U.S. Pat. No. 5,227,419 describes blends of block copolymers whose butadiene-containing blocks have a styrene gradient. In the blend, the block copolymer having the higher proportion of styrene blocks is likewise present in a minor amount.

However, in blends with polystyrene and with comparable toughness, the block copolymers described lead to a dramatic reduction in the rigidity compared with that of polystyrene. Furthermore, the heat distortion resistance is substantially reduced.

WO 03/046075 describes transparent styrene/butadiene block copolymer blends which, in blends with polystyrene, have an improved toughness/rigidity ratio and a higher heat distortion resistance.

It was an object of the present invention to provide improved elastomers based on styrene/butadiene block copolymers having a low yield point and low modulus of elasticity. The elastomers should moreover have a high elasticity.

Accordingly, the abovementioned blends were found.

The blends preferably contain a) from 10 to 30% by weight of the block copolymer of the structure (I) and b) from 90 to 70% by weight of the block copolymer of the structure (II).

Vinylaromatic monomers which may be used are, for example, styrene, alpha-methylstyrene, styrenes alkylated on the nucleus, such as p-methylstyrene or tert-butylstyrene, or 1,1-diphenylethylene or mixtures thereof.

Preferred dienes are butadiene, isoprene, 2,3-dimethylbutadiene, 1,3-pentadiene, 1,3-hexadiene or piperylene or mixtures thereof; butadiene and isoprene are particularly preferred.

Particularly preferred block copolymers are formed from the monomers styrene and butadiene.

The blocks $(S/B)_1$ and $(S/B)_2$ are composed of dienes and vinylaromatic monomers. The vinylaromatic monomer/diene ratio is as a rule in the range from 0.1 to 0.9 for the blocks $(S/B)_1$ and $(S/B)_2$, it being possible for the same or different vinylaromatic monomer/diene ratios to be present in the blocks $(S/B)_1$ and $(S/B)_2$. Preferably, the copolymer blocks $(S/B)_1$ and $(S/B)_2$ have a vinylaromatic monomer/diene ratio in the range from 0.3 to 0.7. Particularly preferably, the copolymer blocks have a random distribution of the diene and vinylaromatic monomers. The blocks $(S/B)_1$ and $(S/B)_2$ may also be divided into a plurality of blocks having a different vinylaromatic monomer/diene ratio.

The transitions between the individual blocks are sharp, i.e. the composition changes abruptly.

The number average molar masses $M_n$ of $S_1$ are in the range from 40 000 to 100 000 g/mol, preferably in the range from 45 000 to 70 000, particularly preferably in the range from 50 000 to 60 000. The number average molar masses $M_n$ of $S_2$, $S_3$, and $S_4$ are in each case and independently of one another in the range from 5000 to 20 000 g/mol, preferably in the range from 8000 to 17 000 g/mol, particularly preferably in the range from 11 000 to 14 000 g/mol. The blocks $B_1$ and $B_2$ of dienes or copolymer blocks of dienes and vinylaromatic monomers have in each case, independently of one another, a number average molar mass $M_n$ in the range from 15 000 to 40 000 g/mol, preferably in the range from 18 000 to 30 000 g/mol, particularly preferably in the range from 20 000 to 25 000 g/mol.

The block copolymers (II) preferably have a symmetrical structure, i.e. the blocks $S_3$ and $S_4$ have the same number average molar masses $M_n$. The block copolymers (I) on the other hand are substantially asymmetrical with a ratio of the number average molar masses of $S_1$ to $S_2$ of at least 2, preferably in the range of 5-8.

The blends according to the invention can be prepared by preparing the block copolymers (I) and (II) in each case by sequential anionic polymerization of vinylaromatic monomers and dienes with organo-alkali metal initiators in succession or in different reactors and then mixing them in the weight ratio in the range of 5/95-40/60, preferably from 10/90 to 30/70.

Anionic polymerization initiators which may be used are the conventional mono-, bi- or polyfunctional alkali metal alkyls, aryls or aralkyls. It is expedient to use organolithium compounds, such as ethyl-, propyl-, isopropyl-, n-butyl-, sec-butyl-, tert-butyl-, phenyl-, diphenylhexyl-, hexamethyldi-, butadienyl-, isoprenyl- or polystyryllithium, 1,4-dilithiobutane, 1,4-dilithio-2-butene or 1,4-dilithiobenzene. The required amount of polymerization initiator depends on the desired molecular weight. As a rule, it is in the range from 0.001 to 5 mol %, based on the total amount of monomers.

The polymerization can be carried out in the presence of a solvent. Suitable solvents are the aliphatic, cycloaliphatic or aromatic hydrocarbons which are customary for anionic polymerization and have 4 to 12 carbon atoms, such as pentane, hexane, heptane, cyclohexane, methylcyclohexane, isooctane, benzene, alkylbenzenes, such as toluene, xylene, ethylbenzene or decalin, or suitable mixtures. Cyclohexane and methylcyclohexane are preferably used.

In the presence of metal organyls which have a retardant effect on the polymerization rate, such as magnesium, aluminum or zinc alkyls, the polymerization may also be carried out in the absence of a solvent.

After the end of the polymerization, the living polymer chains can be blocked using a chain terminating agent. Suitable chain terminating agents are proton-active substances or Lewis acids, such as, for example, water, alcohols, aliphatic or aromatic carboxylic acids and inorganic acids, such as carbonic acid or boric acid.

The mixing of the block copolymers can be effected at any desired time after the end of the polymerization, i.e. for example before or after the termination, devolatilization or other working-up steps. The preparation of the block copolymers (I) and (II) separately as a function of time or space has the advantage that the number average molar masses $M_n$ of the individual blocks S and B can be freely chosen.

According to an alternative process, the block copolymers (I) and (II) can be prepared by sequential anionic polymerization of vinylaromatic monomers and dienes with organoalkali metal initiators simultaneously in a reactor by dual, joint metering of initiator and vinylaromatic monomers, the ratio of the amount of initiator $I_1$ of the first metering to the amount of initiator $I_2$ of the second metering being dependent on the desired mixing ratio and the block structures of the block copolymers (I) and (II). After each metering, polymerization is effected up to complete conversion of the monomers. The blends obtained by this process have in each case the same number average molar masses $M_n$ for the blocks $S_2$ and $S_4$ and the same number average molar masses $M_n$ for the blocks $(S/B)_1$ and $(S/B)_2$. The successive meterings and the polymer species formed are listed in table 1:

TABLE 1

Sequence of metering in the case of dual initiator metering

| Stage | Monomers/Initiators | Species formed |
|---|---|---|
| 1 | Initiator ($I_1$) and vinylaromatic monomer | |
| 2 | Initiator ($I_2$) and vinylaromatic monomer | $S_1$-$I_1$ |
| | | $S_3$-$I_2$ |
| 3 | Diene and vinylaromatic monomer | $S_1$-$(S/B)_1$-$I_1$ |
| | | $S_3$-$(S/B)_2$-$I_2$ |
| 4 | Vinylaromatic monomer | $S_1$-$(S/B)_1$-$S_2$-$I_1$ |
| | | $S_3$-$(S/B)_2$-$S_4$-$I_2$ |
| 5 | Terminating agent, e.g. isopropanol | $S_1$-$(S/B)_1$-$S_2$ |
| | | $S_3$-$(S/B)_2$-$S_4$ |

By addition of Lewis bases, such as tetrahydrofuran, or of potassium salts, such as potassium tetrahydrolinaloolate, a random distribution of the vinylaromatic monomers and dienes in the blocks $(S/B)_1$ and $(S/B)_2$ can be achieved.

The blends according to the invention which comprise the linear block copolymers (I) and (II) can be mixed with thermoplastic polymers in wide ranges.

Owing to the structural similarity, the block copolymers (I) and (II) have high miscibility and no macrophase separation occurs. In the mixing range according to the invention, a worm-like, cylindrical and hexagonal morphology and elastomeric behavior are found.

Owing to the different flexible phase fraction, the block copolymers (I) behave like thermoplastics and the block copolymers (II) like elastomers. The flexible phase fraction $(S/B)_1$ of the block copolymer (I) is not more than 55% by weight, preferably from 20 to 50% by weight, based on the block copolymer (I). The block copolymer (II) has a flexible phase fraction $(B/S)_2$ of at least 65% by weight, preferably in the range from 70 to 90% by weight. At high fractions of block copolymers (I), the blends have a particularly high toughness/rigidity ratio with a maximum modulus of elasticity and yield point. At about 80% by weight of block copolymer (I) and 20% by weight of block copolymer (II), a lamellar structure and a high elongation at break of about 450% are found.

In the mixing range according to the invention, the block copolymer blends behave like elastomers and preferably have a modulus of elasticity in the range from 50 to 200 MPa, preferably in the range from 60 to 180 MPa. Furthermore, they have high elasticity, which is evident from the low permanent tensile set in the hysteresis test.

The block copolymer blends according to the invention can be modified by partial or complete hydrogenation. As a rule, the degree of hydrogenation of the olefinic double bond is 97% or higher, and the degree of hydrogenation of the vinylaromatic monomers is preferably at least 90%, particularly preferably at least 95%, in particular 98%.

The proportion of the polymerized diene units which is present in the 1,2-vinyl form can be regulated by the addition of substances having donor properties, such as ethers or amines.

Tetrahydrofuran, dimethoxyethane or 2-alkylfurfuryl ethers in amounts of from 0.1 to 1% by volume, in particular from 0.25 to 0.5% by volume, based on the hydrocarbon used as solvent, e.g. cyclohexane, are preferred for this purpose.

After the preparation of the block copolymer, the unsaturated bonds of the diene units and also of the vinylaromatic units of the block copolymer are hydrogenated using a hydrogenation catalyst. Supported hydrogenation catalysts are preferably used. For example, inorganic substrates, such as barium sulfate, silicates, carbon or aluminas, are suitable as support material. Suitable hydrogenation metals are, for example, nickel, cobalt, rhodium, ruthenium, palladium, platinum or other metals of group 8.

The hydrogenation is preferably effected in a saturated hydrocarbon as solvent, in which the block copolymer is soluble. Cycloaliphatic hydrocarbons, in particular cyclohexane, are preferred. Expediently, the solvent used is the same as that in the polymerization, so that the hydrogenation can be effected in a process step which follows the polymerization. The hydrogenation can be effected batchwise or continuously, and a continuous hydrogenation over a fixed-bed catalyst is preferred.

The hydrogenation is generally effected at temperatures in the range from 40° C. to 250° C., particularly preferably in the range from 120° C. to 180° C. The hydrogenation can be carried out at from atmospheric pressure to 350 bar, preferably in the range from 100 to 250 bar.

EXAMPLES

SB I:

The block copolymer SB I of the structure (I) having a middle block (S/B) composed of two random copolymer blocks and a flexible phase fraction of 49% by weight was prepared according to example 9 from WO 00/58380 by sequential anionic polymerization of styrene and butadiene in the presence of potassium tert-amylate as a randomizer.

SB II:

The block copolymer SB II of the structure (II) having a middle block (S/B) composed of two random copolymer blocks and a flexible phase fraction of 78% by weight was prepared according to example 2 from U.S. Pat. No. 6,197,889 B1 by sequential anionic polymerization of styrene and butadiene in the presence of potassium tert-amylate as a randomizer.

Measurements:

The mechanical values, such as modulus of elasticity, tensile strength and elongation at break, were determined according to ISO 527. The permanent tensile set was determined from hysteresis tests.

Examples 1-4 and Comparative Experiments C1 to C6

For the preparation of the block copolymer blends of examples 1-4 and of comparative experiments C1-C6, the proportions by weight of SB I and SB II stated in table 1 were mixed in a devolatilization extruder. The mechanical values of the block copolymer blends are listed in table 2. Up to 40% by weight of SB I, the yield point and the permanent tensile set remain at the low level of the block copolymer SB II.

TABLE 1

Mechanical properties of the blends of styrene/butadiene block copolymers I and II

| Example | SB I/SB II [% by wt.] | Modulus of elasticity [MPa] | Yield point [MPa] | Elongation at break [%] | Tensile strength [MPa] | Stress at 400% [MPa] | Permanent tensile set at 300% elongation [%] |
|---|---|---|---|---|---|---|---|
| SB I | 100/0 | 530 | 12.5 | 402 | 32.6 | 32.6 | 206 |
| C1 | 90/10 | 619 | 11.21 | 428 | 32 | 29.6 | |
| C2 | 80/20 | 662 | 11.25 | 429 | 31.5 | 27.7 | |
| C3 | 70/30 | 541 | 9.34 | 479 | 30.4 | 22.4 | |
| C4 | 65/35 | 382 | 8.25 | 494 | 29.8 | 18.1 | |
| C5 | 60/40 | 258 | 7.01 | 497 | 29.2 | 17 | |
| C6 | 50/50 | 255 | 6.1 | 514 | 35.6 | 15.5 | |
| 1 | 40/60 | 175 | 4.87 | 519 | 33.05 | 14.6 | 103 |
| 2 | 30/70 | 131 | 3.97 | 529 | 31.19 | 13.2 | 94 |
| 3 | 20/80 | 105 | 3.64 | 535 | 29.5 | 12.5 | 68 |
| 4 | 10/90 | 87 | 3.21 | 556 | 27.7 | 10.8 | 60 |
| SB II | 0/100 | 65 | 2.91 | 579 | 25.79 | 9.1 | 56 |

We claim:

1. A blend comprising
a) from 10 to 30% by weight of a linear block copolymer of vinylaromatic monomers and dienes of the structure (I) $S_1$—$(B/S)_1$—$S_2$ having a flexible phase fraction $(B/S)_1$ of not more than 55% by weight, based on the block copolymer (I) and
b) from 90 to 70% by weight of a linear block copolymer of vinylaromatic monomers and dienes of the structure (II) $S_3$—$(B/S)_2$—$S_4$ having a flexible phase fraction $(B/S)_2$ of at least 65% by weight, based on the block copolymer (II),
where $S_1$ is a block of vinylaromatic monomers having a number average molar mass $M_n$ in the range from 40 000 to 100 000 g/mol,
$S_2$, $S_3$ and $S_4$ are in each case blocks of vinylaromatic monomers having a number average molar mass $M_n$ in the range from 5000 to 20 000 g/mol, $(B/S)_1$ and $(B/S)_2$ are in each case copolymer blocks of dienes and vinylaromatic monomers having a number average molar mass $M_n$ from 15 000 to 40 000 g/mol and wherein the blend has a modulus of elasticity in the range from 50 to 200 mPa.

2. The blend according to claim 1, wherein the vinylaromatic monomer/diene ratio in blocks $(B/S)_1$ or $(B/S)_2$ is in the range from 0.3 to 0.7.

3. The blend according to claim 1, wherein the blocks $(S/B)_1$ and $(S/B)_2$ are in each case copolymer blocks of dienes and vinylaromatic monomers having random distribution.

4. The blend according to claim 1, wherein the number average molar masses $M_n$ of $S_1$ is in the range from 45 000 to 70 000, of $S_2$, $S_3$, and $S_4$ are in each case in the range from 8000 to 17 000 g/mol, and of $(B/S)_1$ and $(B/S)_2$ are in each case in the range from 18 000 to 30 000 g/mol.

5. The blend according to claim 1, wherein the blocks $S_3$ and $S_4$ have the same number average molar masses $M_n$.

6. The blend according to claim 1, wherein in each case the number average molar masses $M_n$ of $S_2$ and $S_4$ and the number average molar masses $M_n$ of $(B/S)_1$ and $(B/S)_2$ have the same value.

7. A process for the preparation of a blend according to claim 1, wherein the block copolymers (I) and (II) are prepared in each case by sequential anionic polymerization of vinylaromatic monomers and dienes with organo-alkali metal initiators in different reactors and are then mixed.

8. The process for the preparation of a blend according to claim 6, wherein the block copolymers (I) and (II) are initiated simultaneously in a reactor by dual, joint metering of organo-alkali metal initiators and vinylaromatic monomers and are polymerized by sequential anionic polymerization of vinylaromatic monomers and dienes.

9. A process for the preparation of a blend according to claim 1, wherein the block copolymers (I) and (II) are prepared in each case by sequential anionic polymerization of vinylaromatic monomers and dienes with organo-alkali metal initiators in different reactors and are then mixed.

10. A process for the preparation of a blend according to claim 2, wherein the block copolymers (I) and (II) are prepared in each case by sequential anionic polymerization of vinylaromatic monomers and dienes with organo-alkali metal in different reactors and are then mixed.

11. A process for the preparation of a blend according to claim 3, wherein the block copolymers (I) and (II) are prepared in each case by sequential anionic polymerization of vinylaromatic monomers and dienes with organo-alkali metal initiators in different reactors and are then mixed.

12. A process for the preparation of a blend according to claim 4, wherein the block copolymers (I) and (II) are prepared in each case by sequential anionic polymerization of vinylaromatic monomers and dienes with organo-alkali metal initiators in different reactors and are then mixed.

13. A process for the preparation of a blend according to claim 5, wherein the block copolymers (I) and (II) are prepared in each case by sequential anionic polymerization of vinylaromatic monomers and dienes with organo-alkali metal initiators in different reactors and are then mixed.

14. A process for the preparation of a blend according to claim 6, wherein the block copolymers (I) and (II) are prepared in each case by sequential anionic polymerization of vinylaromatic monomers and dienes with organo-alkali metal initiators in different reactors and are then mixed.

15. The blend according to claim 1, wherein a ratio for the average number molar masses of $S_1$ to $S_2$ is in the range of 5 to 8.

* * * * *